Jan. 21, 1936.                W. G. DOHERTY                2,028,503
                            MEASURING APPARATUS
                            Filed Nov. 13, 1933              2 Sheets-Sheet 1
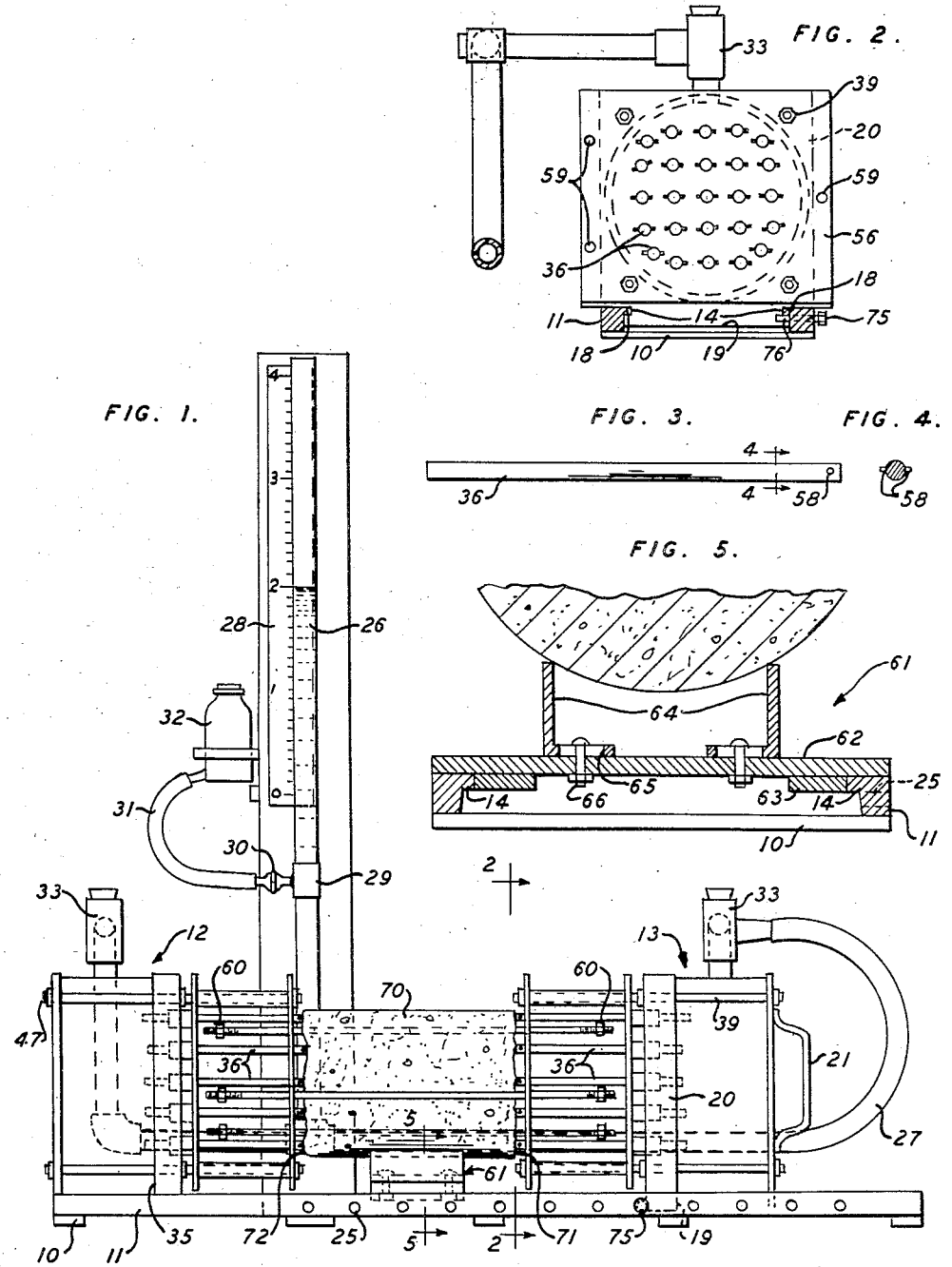
INVENTOR
WALTER G. DOHERTY
BY
Russell C Terry
ATTORNEY

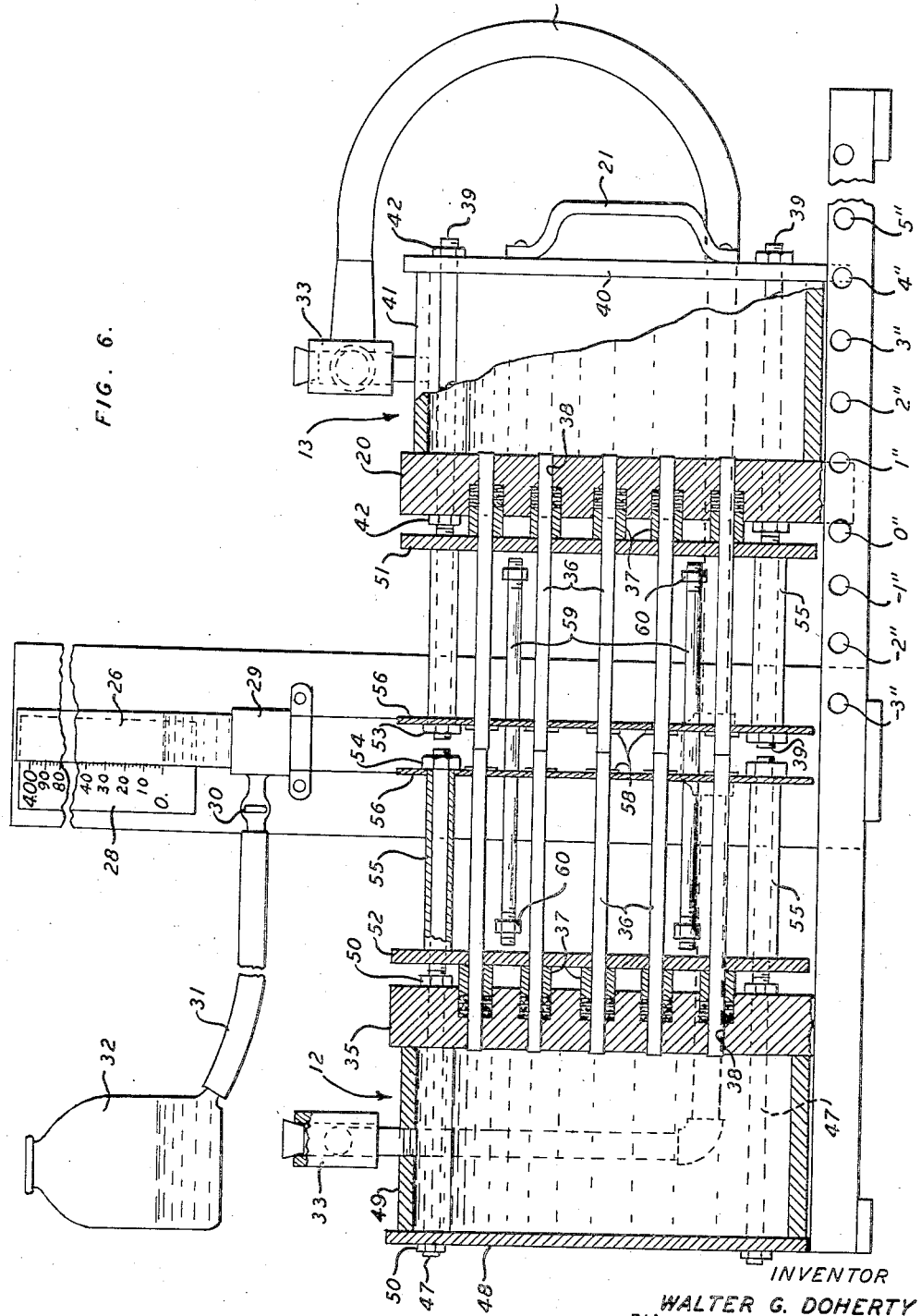

Patented Jan. 21, 1936

2,028,503

UNITED STATES PATENT OFFICE 2,028,503

MEASURING APPARATUS

Walter G. Doherty, New York, N. Y.

Application November 13, 1933, Serial No. 697,834

21 Claims. (Cl. 33—147)

This invention relates to an apparatus for measuring the average length of an object, and more specifically to an apparatus for measuring the average length of an object of irregular contour.

Heretofore, a number of measuring devices were conceived for the purpose of determining a single measurement between oppositely disposed faces having all points of each lying substantially in the same plane. While such devices have been satisfactory for performing that specific function, it has always been desired to obtain a device that will be capable of determining in a single operation the average measurement between two oppositely positioned and irregularly shaped faces having the points of each disposed in several planes.

Accordingly, the present invention contemplates for one of its objects to provide a caliper for determining in a single operation the average distance between two oppositely disposed faces, each being of irregular contour; namely, the average distance between the opposite irregular faces of a core of concrete, asphalt, stone, or similar material, drilled from a highway, pavement, or sidewalk or the like.

Another object is to provide a caliper of this type which permits of facile and expeditious operation whereby an economy of time is effected.

A further object of this invention is to provide a caliper that is extremely accurate since it automatically indicates the measurements thereby eliminating the errors usually resulting from the use of a conventional type of measuring device.

In the preferred illustrated embodiment of the invention, there is contemplated the utilization of tracks formed with a plurality of measuring apertures and supporting two opposed cylinder units in a manner that one of the latter is movable longitudinally with respect to the other which is fixed. Each of the cylinder units is provided with two immiscible fluids and is adapted with a plurality of piston-like fingers capable of being displaced in the cylinder units to cause a displacement of the lighter fluid therefrom into a communicating indicator tube whose internal diameter is substantially less than the combined diameters of the fingers and bears a fixed ratio thereto whereby a predetermined displacement of the fingers in the cylinder units effects a corresponding displacement of the level of the fluid in the indicator tube.

In the operation of the apparatus one of the measuring apertures is marked "0" to indicate the position of abutment between the end surfaces of the opposed pluralities of fingers when the latter are retracted from the respective cylinder units to the outermost limit of movement and there is no core in the apparatus. There is then slidably positioned intermediate the opposed cylinder units a core having the opposite irregular surfaces thereof exposed to the fingers of the cylinder units, the fingers being retracted to their outermost limit of movement thereby causing the level of the fluid in the tube to settle exactly at the "0" point. A stop member is predeterminedly positioned in another of the measuring apertures of the track thereby limiting a leftwardly movement of the slidable cylinder unit. As the latter is actuated leftwardly, the fingers thereof contact the nearer of the irregular surfaces of the core, and then the cylinder unit and core are urged leftwardly until the fingers of the fixed cylinder unit contact the irregular surface that is nearer thereto. The movement of the slidable cylinder unit and core is continued until the former engages the predeterminedly positioned stop member thereby causing the fingers to move into their respective cylinder units to displace predetermined amounts of the lighter fluid therefrom into the communicating indicator tube to effect a change in the level of the fluid in the latter equal to the combined average displacements of the fingers in the cylinder units. The change in the level of the fluid in the tube added to the distance between "0" aperture and the aperture containing the stop member will be equal to the average distance between the opposite irregularly shaped surfaces of the core.

The invention will become more readily apparent from the following description considered with reference to the accompanying drawings, wherein Fig. 1 is an elevational view showing a core testing apparatus embodying the preferred features of the invention;

Fig. 2 is a sectional view taken along the lines 2—2 of Fig. 1;

Fig. 3 is a longitudinal view of a piston-like finger;

Fig. 4 is a sectional view taken along the lines 4—4 of Fig. 3;

Fig. 5 is a fragmentary view taken along the lines 5—5 of Fig. 1 showing details of the core support;

Fig. 6 is an enlarged view partly in elevation and partly in elevational section showing the fingers in abutment and completely retracted from the opposed cylinders.

Referring to the drawings in which corresponding parts throughout the several views are identified by the same reference numeral, it will be observed that the apparatus comprises a plurality of laterally spaced transverse members 10 suitably affixed to a level surface and supporting two laterally spaced tracks 11 (Figs. 1, 2, and 5) upon which there are positioned in opposed relation a fixed left hand cylinder unit 12 and a slidable right hand cylinder unit 13. (Fig. 1.) The inner surfaces of the tracks are provided preferably with flanges 14 (Figs. 2 and 5) engaging oppositely disposed recesses 18 provided in the lowermost portion 19 (Figs. 1 and 2) of the front face 20 of the slidable cylinder unit 13 whereby a uniform movement of the latter is effected under actuation of a handle 21. In addition the tracks are preferably formed with a plurality of predeterminedly spaced longitudinal apertures 25 for a purpose that will be described more specifically hereinafter.

Each of the cylinder units is provided with two immiscible fluids, preferably, with a heavy fluid in the bottom and a lighter one in the top, and arranged so that the uppermost portion of each communicates with the bottom of a vertically positioned glass tube 26 through a suitable flexible conduit 27 which readily permits the movements of the slidable cylinder unit 13. A conventional scale 28 with graduations in inches thereon is located adjacent the tube. Mounted on the lowermost portion of the tube is a coupling 29 provided with a petcock 30 connecting preferably through a flexible tubing 31 with a well known type of aspirator bottle 32 whereby the level of the fluid in tube may be readily adjusted. Also each of the cylinder units is suitably adapted with vents 33 to facilitate the elimination of any air pockets that might be formed therein during the initial charging thereof with the fluids.

The front face 20 of the cylinder unit 13 and a similarly disposed face 35 of the opposing cylinder unit 12 are provided with a plurality of piston-like fingers 36 (Figs. 1, 2, 3, and 6) disposed substantially in concentric circles (Fig. 2) and capable of moving readily into and out of the respective cylinder units through suitable packing glands 37 (Fig. 6) and connecting apertures 38 provided in the cylinder faces (Fig. 6). It will be understood that the movements of the fingers displace predetermined amounts of the lighter fluid from the cylinder units into the indicator tube communicating therewith since the internal diameter of the indicator tube bears a fixed ratio to the diameters of the fingers. Accordingly, the preferable relation is that when the fingers are retracted from the respective cylinder units to their outermost limit of movement, the level of the fluid in the tube registers exactly at the 0 point, and a combined longitudinal displacement of 1″ of the fingers in both cylinder units produces a proportional displacement in the level of the fluid in the tube with respect to the 0 point thereof.

Bolts 39 mounted in the four corners of the cylinder unit 13 (Figs. 1, 2 and 6) firmly fasten the face plate 20 and an opposite face plate 40 to a fluid containing cylinder 41 under tension of nuts 42. Similarly, bolts 47 disposed in the four corners of the cylinder unit 12 rigidly secure the face plate 35 and an opposite face plate 48 to a fluid retaining cylinder 49 under tension of nuts 50 (Fig. 6). It is understood, of course, that the fluid holding cylinders 41 and 49 are adapted preferably with conventional types of gaskets to render fluid tight the attachment of the face plates thereto. In addition, the bolts 39 and 47 serve to support plates 51 and 52 associated with cylinder units 13 and 12 respectively, and suitably apertured to provide bearings for the piston-like fingers. The plates 51 and 52 are utilized to bear against the outermost faces of the packing glands to maintain the latter firmly positioned in the cylinder faces 20 and 35 respectively under tension of nuts 53 and 54 which abut one end of pipe sleeves 55 (Fig. 6) positioned intermediate the nuts 53 and plate 51 and nuts 54 and plate 52 on the bolts 39 and 47 respectively. Also the pipe sleeves 55 provides bearings for rectangular plates 56 that are provided with suitable apertures to accommodate the pipe sleeves and the free ends of the piston-like fingers in a manner to form bearings for the latter in their movements into and out of their respective cylinder units. The nuts 53 and 54 are predeterminedly positioned on the bolts 39 and 47 respectively to fix the outermost limit of movement of the plates 56 thereby determining the extent of the retraction of the piston-like fingers from their respective cylinder units in a manner that will be now described.

A pin 58 (Figs. 1, 3, 4, and 6) is mounted transversely in an end portion of each piston-like finger to abut the opposed surfaces of the plates 56 that are preferably connected by a plurality of bolts 59 suitably disposed on the outer edges of the former (Figs. 1, 2 and 6). Nuts 60 are predeterminedly positioned on the opposite ends of the bolts 59 to engage the inner surfaces of the plates 56 when the latter are moved by actuating the cylinder unit 13. Therefore, the retraction of the fingers from the respective cylinder units to their outermost limit of movement is accomplished by sliding the cylinder unit 13 rightwardly to cause the nuts 60 of the bolts 59 to abut the opposite surfaces of the plates 56 to slide the latter along the sleeves 55. Inasmuch as the pins 58 of the fingers abut the opposed surfaces of the plates 56, the fingers are caused to be retracted from their respective cylinder units until the plates 56 engage the nuts 53 and 54 on the bolts 39 and 47, respectively, whereupon the actuation of the cylinder unit 13 is arrested thereby terminating the movements of the plates 56 and the fingers. As previously explained, the nuts 53 and 54 are predeterminedly positioned to control the extent of the retraction of the fingers from their respective cylinder units. It is preferable therefore, to position the nuts 53 and 54 on the bolts 39 and 47, respectively, so that the fingers are entirely retracted from the cylinder units, in a manner that the inner face of each finger is exactly aligned with the inner surface of the front face plates 20 and 35 of the units 13 and 12 respectively (Fig. 6). With the fingers in this position, it is readily apparent that there is no displacement of fluid from the cylinder units 12 and 13.

A core support 61 positioned intermediate the opposed cylinder units 12 and 13 (Fig. 1) comprises a member 62 whose under surface on opposite end portions is provided with transverse guides 63 that abut the inner surfaces of the flanges 14 on the tracks 11 (Fig. 5). It will be evident, then, that an even movement is imparted to the core support as it is urged along the tracks in a manner to be described more specifically hereinafter. Mounted centrally on the upper surface of the member 62 is a pair of oppositely disposed angles 64 provided with transverse slots 65 to accommodate bolts 66 that are utilized to fasten the angles rigidly to the member 62. It will be understood that the slots 65 provide an adjustment whereby the angles can be readily positioned to accommodate various sizes of cores in order that substantially the entire area of its opposite surfaces can be readily exposed to contact with the fingers of the opposed cylinder units.

The operation of the apparatus is as follows: Suppose, for example, it is desired to measure the average length of a concrete core 70 (Fig. 1); that is, the average distance between the irregularly shaped faces 71 and 72.

However, before positioning a core in the apparatus, it is usually desirable to ascertain whether the level of the fluid in the indicator tube is exactly at the 0 point when the fingers of both cylinder units are retracted to their outermost limit of movement so that the end faces of the fingers of one unit are in abutment with end faces of the opposing unit thereby causing no displacement of fluid in the cylinder units (Fig. 6). The particular aperture of the plurality of apertures 25 (Fig. 1) that would arrest a leftwardly movement of the cylinder unit 13 in a manner to be described hereinafter to cause the fingers of both units to occupy this position, is identified as 0" aperture. Accordingly, then, the distance between any aperture 25 and its adjacent aperture is predeterminedly fixed at 1". It will be understood therefore that the distance between 0" aperture and the first aperture to the right or left thereof is 1" so each of these is identified as 1" apertures. Likewise the distance between 0" aperture and the second aperture to the right or left thereof is 2" so each of these is identified as 2" apertures. Similarly, therefore, for the addition of each aperture to the right or left of 0" aperture the distance between that particular aperture and 0" is augmented 1", hence the apertures are identified with numerals that indicate the number of inches each is spaced from 0". Consequently the apertures to the right and left of 0" are identified by numerals 1", 2", 3", etc. (Figs. 1 and 6).

Accordingly the said 0 point test is accomplished by retracting the fingers from their respective cylinder units to their outermost limit of movement in the manner as hereinbefore described, and, then, inserting a pin 75 into 0" aperture of the tracks so that a portion 76 of the former projects into the space intermediate the tracks (Figs. 1 and 2). The cylinder unit 13 is now actuated leftwardly until the lowermost portion 19 of the front face 20 thereof (Fig. 2) engages the portion 76 of the pin 75. With the cylinder units 12 and 13 in this relative position, there is no distance between the outermost faces of the opposed fingers and obviously the faces of the opposed fingers lie in exact abutment. Inasmuch as there is no displacement of the fingers and fluid from the cylinder units it is evident that the level of the fluid in tube should be registering exactly at the 0 point. However if the level varies from the 0 point, it can be readily adjusted to the 0 point by the aspirator bottle 32.

A second preliminary test may be made to check whether the level of the fluid in the tube with respect to its 0 point corresponds with the distance on the track between 0" aperture and any aperture to the left thereof. Suppose, for example, 2" aperture to the left of 0" were selected, it being understood from the previous explanation that the distance between these apertures is predeterminedly fixed at 2". Accordingly the fingers of both units are retracted to their outermost limit of movement in the usual manner thereby causing the level of the fluid in the tube to rest at the 0 point. The pin 75 is inserted into the selected aperture and the unit 13 is actuated leftwardly to engage the pin 75 in the manner as previously explained. It will be understood that in this movement of unit 13, the fingers thereof contact the fingers of unit 12, and with the continued movement of unit 13 the fingers of both units are caused to be displaced in their respective cylinder units until the portion 19 of unit 13 engages the portion 76 of the pin 75 whereupon the displacements of all fingers are arrested. Obviously, then, the finger movements cause the displacement of the lighter fluid in the cylinder units thereby affecting the level of the fluid in the tube. In view of the predetermined ratio between the internal diameter of the tube and the diameters of the fingers, a combined displacement of 1" or fraction thereof of the fingers results in a proportional displacement of the level of the fluid in the tube. Since the selected 2" aperture is fixed at 2" to the left of 0", it is obvious that the units 13 is moved 2" to the left of 0" aperture and, further that if the fingers of unit 12 were fixed in the position determined in the 0 point test, then each of the fingers of unit 13 would be displaced 2" therein. As the fingers of both cylinder units slide with equal facility, however, it is apparent, then, that the fingers of each unit would be displaced 1", or a combined displacement of 2" for both units thereby displacing the level of the fluid in the tube exactly 2" (proportionally) above the 0 point.

A third preliminary test may be made to determine whether a corresponding distance intervenes between the outermost faces of the opposed fingers when the pin 75 is positioned in any one of the several apertures to the right of 0" aperture. Suppose, for example, 3" aperture to the right of 0" were selected, it being understood that the distance between these apertures is exactly 3". Therefore the fingers of both units are retracted to their outermost limit of movement in the usual manner thusly causing the level of the fluid in the tube to rest at the 0 point. The pin 75 is inserted into the selected aperture and the unit 13 actuated leftwardly to engage the pin 75 in the manner as previously described. As the movement of unit 13 is arrested by the pin 75 positioned in aperture 3" to the right of 0" it is apparent that the fingers of unit 13 do not contact the fingers of unit 12 which now lie in the position occupied in the 0 point test hence there is no displacement of the fluid in the tube. Therefore the distance between the end faces of the fingers of the opposed cylinder units should correspond exactly with the distance between 0" and 3" apertures of the tracks—which distance is precisely 3". This distance may be readily verified by the use of a conventional rule.

Obviously, then, preliminary tests with respect to the remaining apertures 25 of the tracks may be accomplished with facility by either of the aforedescribed methods.

Having completed the above preliminary tests the apparatus is now ready to measure the average length of the concrete core 70 (Fig. 1) having opposite faces 71 and 72 of irregular contour. For purposes of this description the distance has been visually estimated to lie between 5" and 6". Accordingly the cylinder unit 13 is actuated rightwardly in the usual manner to retract all of the fingers of the respective units to their outermost limit of movement. As it has been seen heretofore, this position of the fingers causes the level of the fluid in the indicator tube to rest precisely at the 0 point. The core 70, is then positioned centrally of the support by the adjustment of the oppositely disposed angles so that substantially the entire areas of the opposite faces 71 and 72 are exposed to engagement with the fingers of the respective cylinder units. The pin 75 is inserted into the 3" aperture of the track to the right of 0" with the end portion 76 of the pin 75 projecting into the space intermediate the tracks. The cylinder unit 13 is now actuated leftwardly by the handle until the fingers of this unit contact the surface 71 of the core. As the fingers initially contact the surface 71, the substantially frictionless core support is also urged leftwardly until the opposite surface 72 of the core contacts the fingers of the fixed cylinder unit 12. A continued movement of the unit 13 and the core support causes the fingers of both cylinder units to project into the respective units to displace therefrom a portion of the lighter of the two immiscible fluids until the lowermost portion 19 of the front face 20 of the cylinder unit 13 engages the portion 76 of the stop 75.

It is evident, therefore, that during the movement of the cylinder unit 13 the fingers of both units will engage various points of elevation on the irregularly shaped faces 71 and 72 thereby causing the fingers to project into their respective units unequal distances that correspond to elevations of the several points on the core surfaces. Also, it is seen that the fluid displaced from the cylinder units is conducted to the indicator tube whereby a displacement of the level of the fluid therein is effected. In view of the predetermined relation between the internal diameter of the tube and the diameters of the fingers, the amount of the displacement of the level of the fluid in the tube occasioned by the displacement of fluid in the cylinder units will depend upon the extent of the displacement of the fingers in the latter.

As hereinbefore described the positioning of the pin 75 in 3" aperture of the track to the right of 0" contemplates that if there were no core on the support and the unit 13 were moved leftwardly to engage the pin 75 in the usual manner, there would be exactly 3" intervening between the outermost surfaces of the fingers of the opposed units and the level of the fluid in the tube would remain at the 0 point. However, with a core of a length approximately between 5" and 6" on the support intermediate the opposed units, a leftwardly movement of the unit 13 to engage the pin 75 in the manner described above will cause the fingers to be displaced in their respective units average amounts, each of which will be substantially equal to one-half of the difference between 3" and the ultimate average length of the core.

More specifically, then, suppose that the average length between the irregular faces 71 and 72 were actually 5½" and the pin 75 were positioned in the 3" aperture to the right of 0". It will be understood from the previous explanation that the position occupied by the pin 75 instantly obviates the necessity of the fingers of each unit to project into their respective units average amounts equal to ½ of 3" or 1½", and there remains only the necessity of projecting the fingers of each unit into their respective units an average amount equal substantially to ½ the difference between 3" and 5½", or an average amount of 1¼". In view of the predetermined ratio between the internal diameter of the tube and the diameter of the fingers, a displacement of the fingers in each unit to an average distance of 1¼" will cause a displacement of the lighter fluid from both units to an amount that will effect a change in level of the fluid in the tube equal to the combined displacements of the fingers of both units. Inasmuch as the average displacement of the fingers in each unit was 1¼", the level of the fluid in the tube will be caused to rise 2½" proportionately above the 0 point. Obviously the change in level of the fluid in the tube can be readily determined by the scale positioned adjacent the tube. Therefore, the 3" distance on the track plus the 2½" change of level of the fluid in the tube totals 5½", the length assumed for purposes of clarification.

Since in the sample under test, the distance between the faces 71 and 72 is arbitrarily assumed to lie between 5" and 6" it will be seen that fingers of each unit are caused to be displaced in their respective units average amounts equal substantially to ½ the difference between 3" and the ultimate average distance which lies somewhere between 5" and 6". It has been seen that the combined average displacements of the fingers of both cylinder units effects a change in the level of the fluid of the tube proportional thereto, consequently the 3" distance on the track plus the change in level of the fluid in the tube occasioned by the combined average displacements of the fingers in their respective cylinder units represents the exact average distance between the irregular faces 71 and 72 of the core 70.

Suppose, it is desired to measure the exact average length of an irregular core that is arbitrarily assumed to be approximately 9½". The fingers of both units are entirely retracted and the core is positioned on the support in the usual manner. The pin 75 is inserted into the 5" aperture to the right of 0" (Figs. 1 and 6) and the unit 13 is actuated leftwardly to engage the pin 75. Accordingly, it will be understood, that the average displacement of the fingers of each unit will be equal to ½ the difference between 9½" and 5", or 2¼". Since the change in level of the fluid in the tube is effected by the combined average displacements of the fingers of both units, it will be understood that the fluid in the tube is raised 4½" (proportionally) above the 0 point. The 5" distance of the tracks plus the proportional 4½" displacement in the level of the tube equals 9½", the average length of this particular core.

It is evident that the apparatus may be modified so that the fixed cylinder unit 12 can be movably positioned on the track in a manner similar to cylinder unit 13. In this event pins 75 will be positioned in predetermined apertures 25 of the tracks to the right and left of 0" aperture thereby arresting the movements of both cylinder units. Obviously then, the sum of the distances between 0" aperture and the selected apertures to the right and left thereof plus the displacement of the fluid in the indicator tube will total the average length of the sample under test.

It will be understood from the aforegoing description of the apparatus that the invention is particularly adapted for the determination of the average distance between the opposite irregularly shaped surfaces of a core of concrete, asphalt, etc. However, the invention is obviously capable

What is claimed is:

1. In a measuring apparatus, a track having a plurality of apertures, a member provided with a plurality of substantially concentric apertures and movably mounted on the track, a plurality of members mounted in the apertures of the first mentioned member and capable of displacement therein, and a stop positioned in one of the apertures of the track to engage the first mentioned member for controlling the displacement of the second mentioned members.

2. In a measuring apparatus, a track having a plurality of apertures, opposed members mounted on the track in a manner that one is fixed and the other movable, each of the members being arranged with a plurality of substantially concentric apertures, a plurality of members mounted in the apertures of the first mentioned members and capable of displacement therein, and a stop positioned in one of the apertures of the track to engage the movable member for controlling the displacement of the second mentioned members.

3. In a measuring apparatus, opposed cylinders for positioning therebetween an object to be measured, a member slidably mounted in a wall of each of the cylinders for engagement with the object and capable of variable displacement into the cylinder, and means communicating with the cylinders for indicating the combined displacements of the members.

4. In a measuring apparatus, opposed members for positioning therebetween an object to be measured, a plurality of members slidably mounted in a wall of each of the first mentioned members and capable of variable displacement into the first mentioned member by contact with the object to be measured, and means communicating with the first mentioned members for indicating the combined average displacements of the second mentioned members.

5. In a measuring apparatus, opposed cylinders for positioning therebetween an object to be measured, means for supporting the cylinders, a plurality of members slidably mounted in a wall of each of the cylinders and capable of variable displacement into the cylinder by contact with the object to be measured, and means communicating with the cylinders for indicating the combined average displacements of the members.

6. In a measuring apparatus, opposed cylinders for positioning therebetween an object to be measured, means adapted to support the cylinders in a manner that one is fixed and the other movable, a member slidably mounted in a wall of each of the cylinders and capable of displacement into the cylinder by contact with the object to be measured, and means communicating with the cylinders for indicating the combined displacement of the members.

7. In a measuring apparatus, opposed cylinders for positioning therebetween an object to be measured, means adapted to support the cylinders in a manner that one is fixed and the other movable, a plurality of members slidably mounted in a wall of each of the cylinders, each of the members capable of variable displacement into the cylinder by contact with the object to be measured, and means communicating with the cylinders for indicating the combined average displacements of the members.

8. In a measuring apparatus, a member provided with a plurality of apertures, a cylinder movably mounted on the member, a portion of the cylinder projecting adjacent the member, a member slidably mounted in a wall of each cylinder and capable of variable displacement into the cylinder by contact with the object to be measured, a stop predeterminedly positioned in one of the apertures of the first mentioned member to engage the portion for controlling the extent of the displacement of the second mentioned member, and fluid means communicating with the cylinder for indicating the amount of the displacement of the second mentioned member.

9. In a measuring apparatus, a member provided with a plurality of apertures, a cylinder movably mounted on the member, a portion of the cylinder projecting adjacent the member, a plurality of members slidably mounted in a wall of each cylinder and capable of variable displacement into the cylinder by contact with the object to be measured, a stop predeterminedly positioned in one of the apertures of the first mentioned member to engage the portion for controlling the extent of the displacements of the second mentioned members, and fluid means communicating with the cylinder for indicating the combined average displacements of the second mentioned members.

10. In an apparatus for measuring the length of an object, opposed cylinders for positioning therebetween an object to be measured, spaced members adapted to support the cylinders in a manner that one is fixed and the other movable, one of the members being provided with a plurality of predeterminedly spaced apertures, a portion formed integral with the movable cylinder and projecting adjacent the member, a piston slidably mounted in a wall of each of the cylinders to engage the object, means associated with the cylinders for retracting the pistons from the cylinders, means associated with the cylinders for predeterminedly fixing the outermost extent of the retractive movement of the pistons, one of the apertures of the member being predeterminedly selected to indicate the position when the pistons are in abutment in the outermost extent, a stop predeterminedly positioned in another of the apertures of the member to engage the portion for controlling the extent of the displacement of the pistons in the cylinders when engaging the object, and fluid means communicating with the cylinders for indicating the combined piston displacements which when added to the distance between the second mentioned aperture and the aperture containing the stop totals the length of the object.

11. In an apparatus for measuring the length of an object, opposed cylinders for positioning therebetween an object to be measured, spaced members adapted to support the cylinders in a manner that one is fixed and the other movable, one of the members being provided with a plurality of predeterminedly spaced apertures, a portion formed integral with the movable cylinder and projecting adjacent the member, a plurality of members slidably mounted in a wall of each of the cylinders, each of the second mentioned members capable of variable displacement in the cylinders by contact with the object to be measured, means affixed to an end of each of the second mentioned members, means associated with the cylinders for engaging the first mentioned means to retract the second mentioned members from the cylinders, means associated with the cylinder for fixing the outermost limit of the retractive movement of the second mentioned members, one of the apertures of the first mentioned member being predeterminedly selected to indicate the position when the second mentioned members are in abutment in the outermost retractive limit, a stop predeterminedly positioned in another of the apertures of the first mentioned members to engage the portion for controlling the extent of the displacements of the second mentioned members when engaging the object, and fluid means communicating with the cylinders for indicating the combined average displacements of the second mentioned members which when added to the distance between the second mentioned aperture and the aperture containing the stop, totals the average length of the object.

12. In a measuring apparatus, members for engaging therebetween an object to be measured, fluid reservoirs into which the members movably and variably project, and a fluid column communicating with the reservoirs for indicating by its length the average projections of the members when engaging the object.

13. In a measuring apparatus, opposed fluid reservoirs for positioning therebetween an object to be measured, a member engageable with the object and arranged movably for variable projection into each of the reservoirs to displace the fluid therefrom, and a fluid column responsive to the displaced fluid for indicating by its length the average projections of the members.

14. In a measuring apparatus, opposed fluid reservoirs for positioning therebetween an object to be measured, a plurality of movable members engageable with the object on its opposite surfaces and arranged movably for variable projection into the reservoirs to displace the fluid therefrom, and a fluid column responsive to the displaced fluid for indicating by its length the combined average projections of the members when engaging the object.

15. In a measuring apparatus, movable members for engaging therebetween an object to be measured, fluid reservoirs into which the members movably and variably project to effect a displacement of the fluid, and means responsive to the displaced fluid for indicating the average projections of the members when engaging the object.

16. In a measuring apparatus, opposed fluid reservoirs for positioning therebetween an object to be measured, members engageable with the object and arranged movably for variable displacement into the reservoirs, means for supporting the reservoirs in a manner that one is fixed and other is movable to effect the engagement between the members and the object, and a fluid column communicating with the reservoirs for indicating by its length the average displacements of the members when engaging the object.

17. In a measuring apparatus, opposed fluid reservoirs for positioning therebetween an object to be measured, members engageable with the object and arranged movably for variable displacement into the reservoirs, means for supporting the reservoirs in a manner that one is fixed and the other is movable to effect the engagement between the members and object, the supporting means being arranged with a plurality of apertures, a portion of the movable reservoir projecting adjacent the supporting means, an element positioned in one of the apertures to engage the portion for arresting the movable reservoir for limiting the displacements of the members, and a fluid column communicating with the reservoirs for indicating by its length the average displacements of the members when engaging the object.

18. In a measuring apparatus, opposed fluid reservoirs for positioning therebetween an object to be measured, members engageable with the object and arranged movably for variable displacement into the reservoirs, means for supporting the reservoirs in a manner that one is fixed and the other is movable to effect the engagement between the members and the object, the supporting means being arranged with a plurality of predeterminedly spaced apertures, a portion of the movable reservoir projecting adjacent the supporting means, one of the apertures being predeterminedly identified as "0" to indicate the position of abutment of the members when fully retracted from the reservoirs without the object therebetween, an element positioned in another of the apertures to engage the portion for arresting the displacements of the members when engaging the object, and a fluid column communicating with the reservoirs for indicating by its length the combined average displacements of the members when engaging the object; the average of the displacements and the sum of the spaces between "0" aperture and the aperture in which the element is positioned totaling the average length of the object.

19. In a measuring apparatus, opposed fluid reservoirs for positioning therebetween an object to be measured, members engageable with the object and arranged slidably for variable displacement into the reservoirs, means for supporting the reservoirs in a manner that one is fixed and the other is movable to effect the engagement between the members and the object, the supporting means being arranged with a plurality of predeterminedly spaced apertures, one of the apertures being predeterminedly identified as "0" to indicate the position of abutment of the members when fully retracted from the reservoirs without the object therebetween, an element positioned in another of the apertures to engage the movable reservoir for arresting the displacements of the members when engaging the object, and a fluid column communicating with the reservoirs for indicating by its length the average displacements of the members when engaging the object; the average of the displacements and the sum of the spaces between "0" aperture and the aperture in which the element is positioned totaling the average length of the core.

20. In a measuring apparatus, opposed elements for positioning therebetween an object to be measured, members engageable with the object and arranged for displacement into the elements, means for supporting the elements in a manner that one is fixed and the other is movable, the supporting means being provided with a plurality of predeterminedly spaced apertures, one of the apertures being predeterminedly identified as "0" aperture to indicate the position of abutment of the members when fully retracted from the elements without the object therebetween, and a stop positioned in another of the apertures to arrest the movable element; the sum of the spaces between "0" aperture and the aperture containing the stop being equal to the distance between the fully retracted members for the movement of the movable element.

21. In a measuring apparatus, opposed elements for positioning therebetween an object to be measured, a plurality of members engageable with the object and arranged for displacement into each of the elements, means for supporting the elements in a manner that one is fixed and the other is movable, the supporting means being arranged with a plurality of predeterminedly spaced apertures, a portion of the movable element projecting adjacent the supporting means, one of the apertures being predeterminedly identified as "0" to indicate the position of abutment of the members where fully retracted from the elements, and a stop positioned in another of the apertures to engage the portion for arresting the movable element; the sum of the spaces between "0" aperture and the aperture containing the stop being equal to the distance between the fully retracted members for the movement of the movable member.

WALTER G. DOHERTY.